Figure 1A:
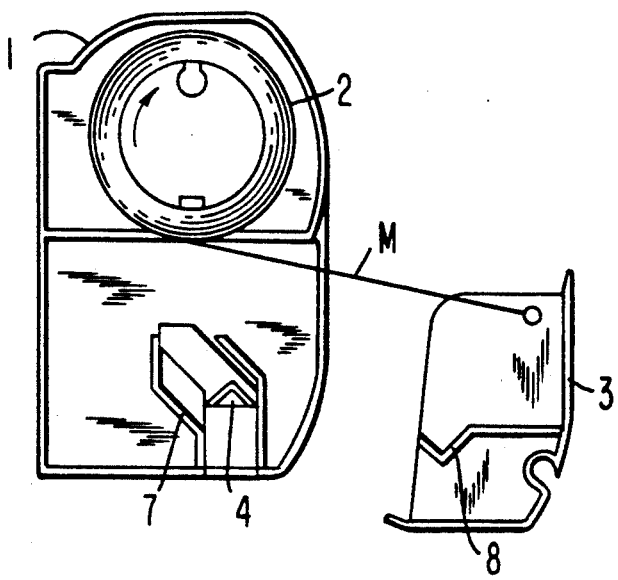

United States Patent [19]

Pozzi

[11] Patent Number: 5,242,003
[45] Date of Patent: Sep. 7, 1993

[54] SAFETY DEVICE FOR AN AWNING
[75] Inventor: Carlo M. Pozzi, Ruvigliana, Italy
[73] Assignee: Fiamma S.p.A., Cardano Al Campo, Italy
[21] Appl. No.: 896,399
[22] Filed: Jun. 10, 1992
[30] Foreign Application Priority Data
Sep. 26, 1991 [DE] Fed. Rep. of Germany ....... 4132017
[51] Int. Cl.⁵ .............................................. E04F 10/00
[52] U.S. Cl. ........................................ 160/22; 160/66
[58] Field of Search ................... 160/22, 66, 67, 68, 160/69, 70, 72, 323.1; 135/89; 292/74, 70, 34.15, 65; 70/441, 432

[56] References Cited
U.S. PATENT DOCUMENTS

| | | | |
|---|---|---|---|
| 1,764,367 | 2/1928 | Szymanski . | |
| 3,923,074 | 12/1975 | McKee | 135/89 X |
| 4,171,013 | 10/1979 | Clark . | |
| 4,733,683 | 3/1988 | Pozzi | 135/89 |
| 4,997,021 | 3/1991 | Brutsaert | 135/89 X |

Primary Examiner—Blair M. Johnson
Attorney, Agent, or Firm—Theodore F. Shiells

[57] ABSTRACT

A safety device for an awning with a permanently installed housing (2) for accommodation of the awning roll (2); with a shutter section which contains the extensible end of the be secured to the housing by means of a locking mechanism, and which in its retracted position serves to close a run-out opening in the housing; and with a warning device adapted to be actuated upon the retraction of the shutter section into the housing through the mechanical cooperation of a first means provided in the shutter section and of a second means provided in the housing, where the warming device is disposed on one of said means that is displaceably mounted and where the warming device provides a visible indication that distinguishes the condition of the shutter section in which it has not yet been fully retracted into the housing and interlocked with it from the condition of accomplished interlocking, thus providing assurance that locking has actually occurred.

7 Claims, 2 Drawing Sheets

SAFETY DEVICE FOR AN AWNING

The invention relates to safety devices for awnings. Such awnings typically have a permanently installed housing for accommodation of the awning roll and a shutter section which contains the extensible end of the awning. In its retracted position, the shutter section serves to close a run-out opening in the housing. The safety device, a locking mechanism, secures the shutter section to the housing. In principle, the safety device in accordance with the invention is suitable for use with all types of awnings, including awnings attached to buildings; however, it is of particular importance and is especially applicable in the case of awnings mounted on vehicles, and especially on motor homes, for example, where an awning housing opening accidentally on the road could have disastrous consequences.

There are a great many different ways of locking the shutter section with the end of the awning held therein in its retracted position to the permanently installed housing. European patent publication 0 230 476 B1, for example, describes a locking mechanism which prevents such accidental, unintentional opening.

What is required in order that a locking mechanism like this, or another, provide the requisite safety is that the shutter section be indeed fully retracted and that the parts to be locked together actually interlock. It has been found in practice that it is perfectly possible for the awning opening to outwardly appear to be completely closed when in fact the locked condition has not yet been brought about. To guard against such false impressions, awnings can be equipped with mechanisms which through the retracting motion draw the shutter section automatically into a locked position. However, such mechanisms are of considerable technical complexity and in addition require at least pull arms engaging the shutter section.

The object of the invention is to provide a safety device for an awning of the type mentioned at the outset which makes it possible to secure the interlocked condition of housing and retracted shutter section and which is readily implemented.

This object is accomplished through the subject matter of claim 1.

In accordance with the invention, a warning device is provided which gives a warning indication whenever the locked condition has not yet been brought about even though the shutter section has been retracted almost completely. This incomplete locking is distinguished from the condition of accomplished locking through a reliable visible indication. To this end, means are provided in both the shutter section and the housing, which cooperate mechanically with each other in such a way that, as the shutter section is being retracted into the housing, a visible warning of said condition is provided and the subsequent locked condition is indicated. To this end, one of the two means is displaceably mounted and provided with the likewise displaceable warning device. Thus the person handling the awning is provided with a reliable indication enabling him to determine whether the locked condition has or has not been brought about.

The necessary mechanically cooperating means can be readily implemented technically in many different ways. One displaceable part carrying the warning device will always suffice. However, designs are also conceivable which comprise displaceable means both on the housing and in the shutter section. In principle, the displaceable means with the warning device may be provided whether on the shutter section or on the housing. In accordance with the invention, however, the latter is preferred.

Moreover, provision is preferably made for the warning device (in the form of a red part, for example) to be visible only while the shutter section still is not completely retracted and locked, and then to disappear. However, designs are also conceivable where the warning device is not visible in the still unlocked condition (thus giving the warning) and becomes visible (in the form of a green part, for example) only in the locked condition to indicate that locking has occurred.

In accordance with an advantageous modification, the mechanically cooperating means comprise a triangular part on both the shutter section and the housing, these parts being inverted relative to each other so that when the two parts are slid over each other, first one part is displaced downward (with the warning device becoming visible), with a triangular part then locking in place behind the other part.

However, many other designs are conceivable. For example, a rounded projection may be used, the projection snapping into a corresponding notch after it has displaced the part in which the notch is formed.

The displacement is preferably implemented through a spring-loaded mount. In accordance with a preferred embodiment, the displaceable part, which carries on its underside the warning device, is forced upward by a spring in the awning housing. As the shutter section is retracted, a projecting part that is permanently installed in the shutter section presses the displaceable part downward against the force of the spring just before the position of full retraction is reached. Once the projecting part has traveled over the displaceable part, the spring again forces the displaceable part upward, and with it the warning device. As an equivalent, a displaceable part may also be provided in the shutter section and in its place a stationary part may be disposed in the housing so that just before locking occurs the warning device on the displaceable part becomes visible.

Existing awnings with any type of locking mechanism for shutter section and housing may be additionally retrofitted with the inventive safety device and will then provide supplementary locking action. Alternatively, the engagement of the means in the shutter section and in the housing which in accordance with the invention cooperate mechanically in the locking action may be utilized in such a way that earlier complicated locking measures can be dispensed with and both functions, warning indication and locking, can be taken over by the inventive safety device.

Figure 1B:
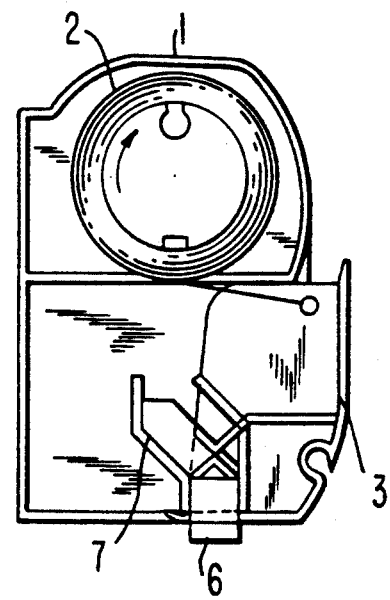
Figure 1C:
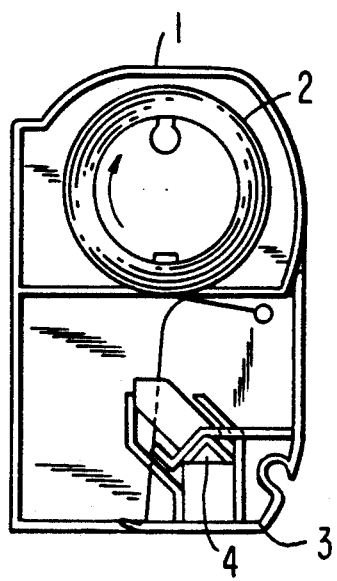
Figure 2A:
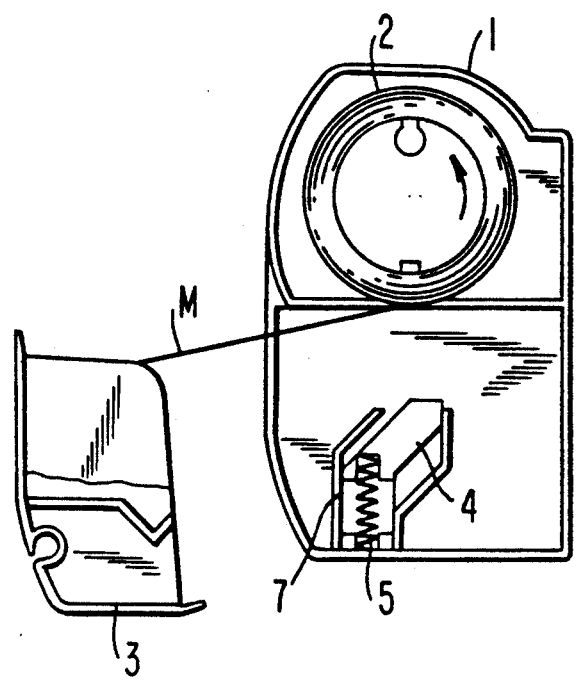
Figure 2B:
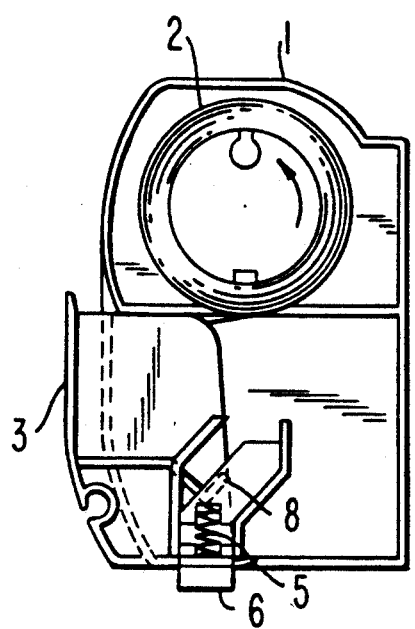

The invention will now be described in detail with reference to the drawings, where FIGS. 1A, 1B and 1C illustrate an exemplary embodiment of the safety device of the invention, viewed from the side and from the interior of the housing, with the shutter section still extended, with the shutter section almost fully retracted, and with the shutter section locked; and FIGS. 2A and 2B illustrate the device of FIG. 1 as viewed from the other side, in the positions corresponding to FIGS. 1A and 1B.

Shown diagrammatically in FIGS. 1 and 2 is a housing 1 which is attached to the wall of a building or of a recreational vehicle, for example, in a manner that is not shown. The housing 1 contains the awning roll 2, which is rotatably supported on a shaft in the housing. A run-out opening extending over the width of the housing permits the awning cloth M, whose leading end is fastened in a shutter section 3, to be extended. When the awning, spread out in the usual manner by means of articulated arms, for example, is retracted, the shutter section 3 closes the run-out opening in the housing.

In many designs, the run-out opening is closed by multipart covers or shutters from the top and bottom. The device of the invention can be used also in such cases.

Above the bottom of the housing, in the front portion of the housing 1, a part 4 of triangular cross section is mounted, point upward, in such a way that it is forced upward by the action of a helical spring 5 which extends vertically from the housing bottom. Part 4, which is triangular at the top, is provided at its bottom with a red warning member 6 which can be run externally through a slot in the bottom of the housing. For part 4 with the spring 5, lateral guides 7 are provided in the manner shown in FIGS. 1 and 2 for the lateral limitation of the perpendicular motion of part 4 with the spring 5.

In the shutter section 3, there is provided a part 8 of likewise triangular cross section which through a horizontal portion is solidly joined to the inner surface of the front wall of the shutter 3 and is arranged tilted by 180 degrees relative to part 4, with the point directed downward toward the bottom of the housing. The arrangement of part 4 in the housing 1 and of part 8 in the shutter section 3 is such that when the shutter section 3 is almost fully retracted and the run-out opening outwardly appears to be completely closed, the two points of the triangular parts 4 and 8 are superimposed (FIG. 1B) and part 4 is forced farthest downward.

When the shutter section 3 is retracted, the two front surfaces of the triangular parts 4 and 8 first come together. As the shutter section is retracted still further, part 4 is forced downward against the force of the spring 5 so that the warning member 6 is pressed down and out of the bottom of the housing to give an externally visible indication that locking has not yet occurred. (FIGS. 1B and 2B.)

During further retraction, part 8 rides completely over part 4 and, after the latter has been caused to shoot up by spring action, locks in place behind it (FIG. 1C), the two rear surfaces of the triangles abutting on each other in interlocking engagement. At the same time, the warning member 6 is retracted into the housing, thus indicating that the shutter section 3 and the housing 1 are locked together.

This indication has a high safety value particularly in the case of awnings on vehicles or house trailers as it enables the operator to make sure that the awning will not open while the vehicle is in motion. So long as the warning member 6 is still visible, it indicates to the operator that locking has not yet been accomplished.

In addition to this preferred embodiment, many alternative designs are possible. For example, the warning member may also become visible on the side of the awning housing. Moreover, designs are conceivable in which there is provided on the shutter section 3 a movable member that is moved by a stationary projecting part in the housing 1. The shape of the mechanically cooperating parts, too, may be basically different, and such cooperating parts with warning members may be provided both laterally and in the middle portion of the awning.

I claim:

1. A safety device for an awning assembly having a housing having a side adapted to be permanently installed on a structure, a side including a run-out opening adapted to permit retraction and extension of a movable shutter section, an awning roll, said awning roll including an extensible end attached to said shutter section, and a locking mechanism for securing said shutter section to said housing when said shutter section is fully retracted into said run-out opening, said safety device comprising first means for mechanical cooperation provided in the shutter section, second means for mechanical cooperation provided in the housing and adapted to mechanically cooperate with said first means, one of said first and second means including a warning device which is visibly displaceable so as to be retractable into and out of said one of said means as said first and second means mechanically cooperate with each other as said shutter section is retracted into the housing to provide positive visible indication to an operator permitting ready discrimination between a condition of the shutter section in which it has not yet been fully retracted into the housing and secured by said locking mechanism from a condition in which the shutter section has been fully retracted into the housing and secured by said locking mechanism.

2. A safety device as defined in claim 1, characterized in that the first means comprises a projecting part which is permanently installed in the shutter section, and that the second means includes said visibly displaceable warning device, said warning device being mounted to be visibly displaced by said projecting part as said first and second means cooperate with each other as said shutter section is retracted into said housing.

3. A safety device as defined in claim 2, characterized in that the second means is spring-supported in the housing.

4. A safety device as defined in claim 2 or claim 3, characterized in that the housing includes a bottom having an inner surface, said second means being mounted on the inner surface of the bottom of the housing and that the warning device provides said positive visible indication by projecting from the bottom when said shutter section is in one of its fully retracted or not yet fully retracted conditions.

5. A safety device as defined in one of claims 1-3, characterized in that the first and second means are latched together when the shutter section is in its fully retracted, closing position.

6. A safety device as defined in one of claims 1-3, characterized in that the first and second means comprise triangular, mechanically cooperating parts, one mounted pointing upward and the other pointing downward, and that when the shutter section is in its fully retracted, closing position the triangular parts are locked in place one adjacent the other.

7. A safety device as defined in one of claims 1-3, characterized in that the visibly displaceable warning device is outwardly visible when the shutter section is in its not yet fully retracted position, and is outwardly invisible when the shutter section is in its the fully retracted, locked position.

* * * * *